(12) United States Patent
Kim (10) Patent No.: US 10,158,243 B2
(45) Date of Patent: Dec. 18, 2018

(54) WIRELESS CHARGER HAVING AUTOMATIC ALIGNMENT FUNCTION AND METHOD THEREOF

(71) Applicant: HYUNDAI MOTOR COMPANY, Seoul (KR)

(72) Inventor: Hyun Joo Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 234 days.

(21) Appl. No.: 15/157,697

(22) Filed: May 18, 2016

(65) Prior Publication Data

US 2017/0085118 A1   Mar. 23, 2017

(30) Foreign Application Priority Data

Sep. 22, 2015  (KR) .......................... 10-2015-0134004

(51) Int. Cl.
*H02J 7/00* (2006.01)
*H02J 7/02* (2016.01)
*H02J 50/10* (2016.01)
*H02J 50/90* (2016.01)

(52) U.S. Cl.
CPC .............. *H02J 7/025* (2013.01); *H02J 50/10* (2016.02); *H02J 50/90* (2016.02)

(58) Field of Classification Search
USPC ....................................................... 320/108
See application file for complete search history.

(56) References Cited

U.S. PATENT DOCUMENTS

| 7,728,551 | B2 | 6/2010 | Reed et al. | |
| 8,242,741 | B2 | 8/2012 | Phelps, III | |
| 8,754,608 | B2 | 6/2014 | Yoon | |
| 2013/0221913 | A1* | 8/2013 | Kim | H02J 7/0042 320/108 |
| 2013/0335015 | A1* | 12/2013 | Ichikawa | H02J 7/025 320/108 |
| 2014/0203770 | A1* | 7/2014 | Salter | H02J 7/0047 320/108 |
| 2015/0022194 | A1 | 1/2015 | Almalki et al. | |
| 2015/0263565 | A1* | 9/2015 | Amano | H02J 7/025 320/108 |

FOREIGN PATENT DOCUMENTS

| JP | 2010-098893 A | 4/2010 |
| JP | 2013-118719 A | 6/2013 |
| JP | 2014-193070 A | 10/2014 |

(Continued)

*Primary Examiner* — Robert Grant
(74) *Attorney, Agent, or Firm* — McDermott Will & Emery LLP (57) ABSTRACT

A wireless charger having an automatic alignment function includes: a charge sensor sensing charging of a portable device disposed on a wireless charging pad within a vehicle; a position regulator regulating positions of the portable device and the charge sensor; and a position sensor sensing the position of the portable device. A controller is configured to move the portable device to a plurality of reference positions on the wireless charging pad sequentially, to detect a charging position on the wireless charging pad based on an induced voltage that is measured in each of the plurality of reference positions and to move the portable device to the charging position.

15 Claims, 9 Drawing Sheets

(56) References Cited

FOREIGN PATENT DOCUMENTS

| | | |
|---|---|---|
| JP | 2014-193087 A | 10/2014 |
| KR | 10-2011-0029734 A | 3/2011 |
| KR | 10-2011-0034773 A | 4/2011 |
| KR | 10-2011-0052972 A | 5/2011 |
| KR | 10-2012-0090240 A | 8/2012 |
| KR | 10-2012-0117262 A | 10/2012 |
| KR | 10-1315976 B1 | 10/2013 |
| KR | 10-2014-0054629 A | 5/2014 |

* cited by examiner

WIRELESS CHARGER HAVING AUTOMATIC ALIGNMENT FUNCTION AND METHOD THEREOF

CROSS-REFERENCE TO RELATED APPLICATION

This application is based on and claims the benefit of priority to Korean Patent Application No. 10-2015-0134004, filed on Sep. 22, 2015, in the Korean Intellectual Property Office, the disclosure of which is incorporated herein in its entirety by reference.

TECHNICAL FIELD

The present disclosure relates to a wireless charger having an automatic alignment function and a method thereof, and more particularly, to a wireless charger having an automatic alignment function and a method thereof for automatically aligning a portable device, which is disposed on a charging pad of a wireless charger mounted in a vehicle for wireless charging on the charging pad.

BACKGROUND

In recent years, a wireless charger for wirelessly charging a built-in battery of a portable device through the installation of a primary coil in the charger and the installation of a secondary coil in the built-in battery of the portable device has been developed.

In order to charge the battery by using such a wireless charger, the alignment of the primary coil and the secondary coil is important, so that a user should place the portable device in a designated position of a wireless charging pad.

However, even when the user places the portable device in the designated position of the wireless charging pad, impacts or the like may change the position of the portable device during battery charging, which causes inconvenience to the user as the user has to manually move the portable device to the designated position of the wireless charging pad.

For example, when the wireless charger is applied to a vehicle, a driver may move a portable device on a wireless charging pad to a designated position while driving, which interrupts safe driving and is also against the road traffic law.

In order to solve the above problem, a wireless charger for aligning a portable device by using a magnetic substance has been proposed as a related art. That is, the wireless charger includes the magnetic substance and the portable device includes a metal plate, such that the magnetic substance attracts the metal plate due to magnetic attraction and the portable device is aligned in an appropriate position.

According to the related art, in consideration of the weight of the portable device or the like, a considerable level of magnetic force is required to align the portable device in an appropriate position with only the magnetic attraction. The magnetic force may affect the operations of the portable device and may also deteriorate the inductive coupling of the primary coil and the secondary coil.

In addition, when a geomagnetic sensor, a gyrosensor, or the like is provided in the portable device, the magnetic force of the magnetic substance may cause the malfunction of the portable device.

SUMMARY

The present disclosure has been made to solve the above-mentioned problems occurring in the prior art while advantages achieved by the prior art are maintained intact.

An aspect of the present disclosure provides a wireless charger having an automatic alignment function and a method thereof, for charging a portable device while maintaining optimal charging efficiency, regardless of the size of the portable device, by moving the portable device disposed on a wireless charging pad within a vehicle to a plurality of reference positions sequentially, detecting an optimal charging position on the wireless charging pad on the basis of induced voltage measured in each of the reference positions, and moving the portable device to the optimal charging position.

According to an exemplary embodiment in the present disclosure, a wireless charger having an automatic alignment function includes: a charge sensor sensing charging of a portable device disposed on a wireless charging pad within a vehicle; a position regulator regulating positions of the portable device and the charge sensor; a position sensor sensing the position of the portable device; and a controller configured to move the portable device to a plurality of reference positions on the wireless charging pad sequentially, to detect a charging position on the wireless charging pad on the basis of induced voltage measured in each of the reference positions, and to move the portable device to the charging position.

According to another exemplary embodiment in the present disclosure, a method for aligning a portable device in a wireless charger includes: moving, by a controller, a portable device, which is disposed on a wireless charging pad within a vehicle, to a plurality of reference positions sequentially; measuring, by a charge sensor, an induced voltage in each of the plurality of reference positions; detecting, by the controller, a charging position on the wireless charging pad based on the measured induced voltage; and moving the portable device to the charging position.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments in the present disclosure will be described in detail with reference to the accompanying drawings. For reference, dimensions of elements or thicknesses of lines illustrated in the drawings referred to describe the present disclosure may be exaggerated for the convenience of understanding. Further, the terms used henceforth have been defined in consideration of the functions of the present disclosure, and may be altered according to the intent of a user or operator, or conventional practice. Therefore, the terms should be defined on the basis of the entire content of this specification.

Figure 1:
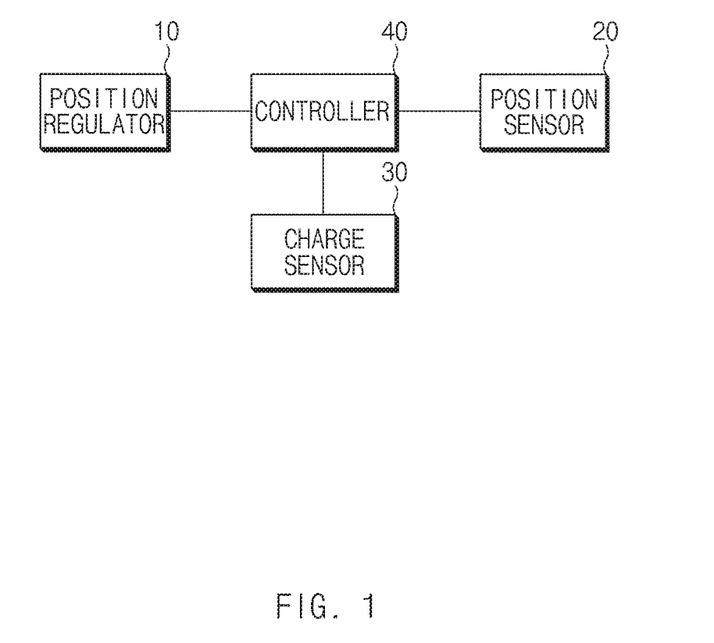
FIG. 1 is a view illustrating a configuration of a wireless charger having an automatic alignment function according to an exemplary embodiment in the present disclosure.

FIG. 1 is a view illustrating a configuration of a wireless charger having an automatic alignment function according to an exemplary embodiment in the present disclosure.

As illustrated in FIG. 1, the wireless charger having an automatic alignment function includes a position regulator 10, a position sensor 20, a charge sensor 30, and a controller 40.

With respect to each of the aforementioned elements, the position regulator 10 may move a portable device on a wireless charging pad within a vehicle to a plurality of reference positions sequentially.

In addition, the position regulator 10 may move the charge sensor 30 to a plurality of reference positions sequentially.

Hereinafter, the functions of the position regulator 10 will be detailed with reference to FIGS. 2 and 3.

Figure 2:
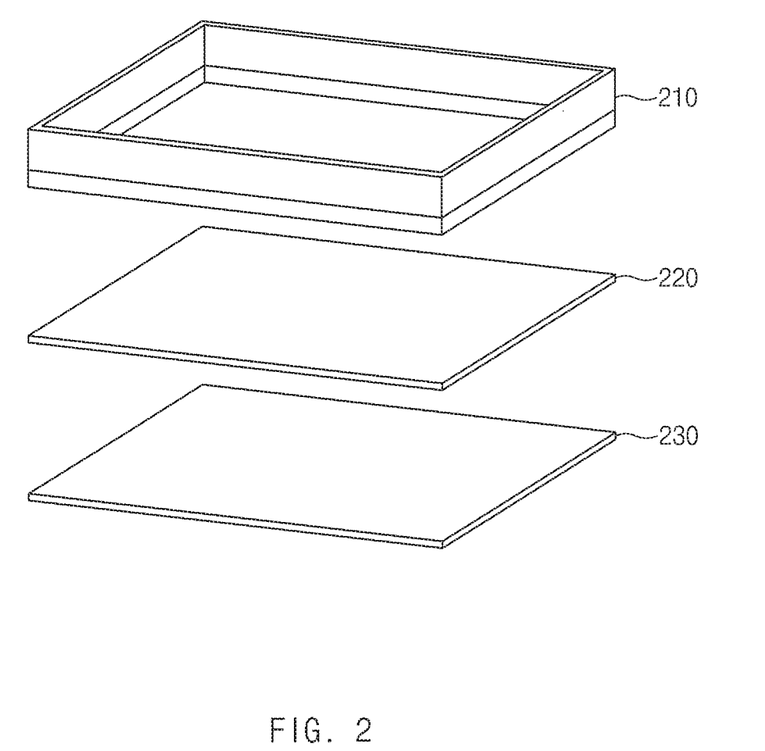
FIG. 2 is a view illustrating a structure of a charging pad according to an exemplary embodiment in the present disclosure.

FIG. 2 is a view illustrating the structure of a charging pad according to an exemplary embodiment in the present disclosure.

In FIG. 2, "210" denotes a partition for preventing a portable device from being separated from a charging pad due to the shaking of the vehicle during the movement of the vehicle; "220" denotes a moving board for moving a portable device and the charge sensor 30; and "230" denotes a wireless charging board for charging the portable device.

As illustrated in FIG. 2, the charging pad has a wireless charging board 230 disposed at the bottom thereof, a moving board 220 disposed above the charging board 230, and the partition 210 disposed at the edges of the moving board 220. Here, a predetermined gap is provided between the wireless charging board 230 and the moving board 220, thereby preventing the generation of frictional force when the wireless charging board 230 and the moving board 220 independently move. In addition, the partition 210 is fixed to the edges of the moving board 220.

Figure 3:
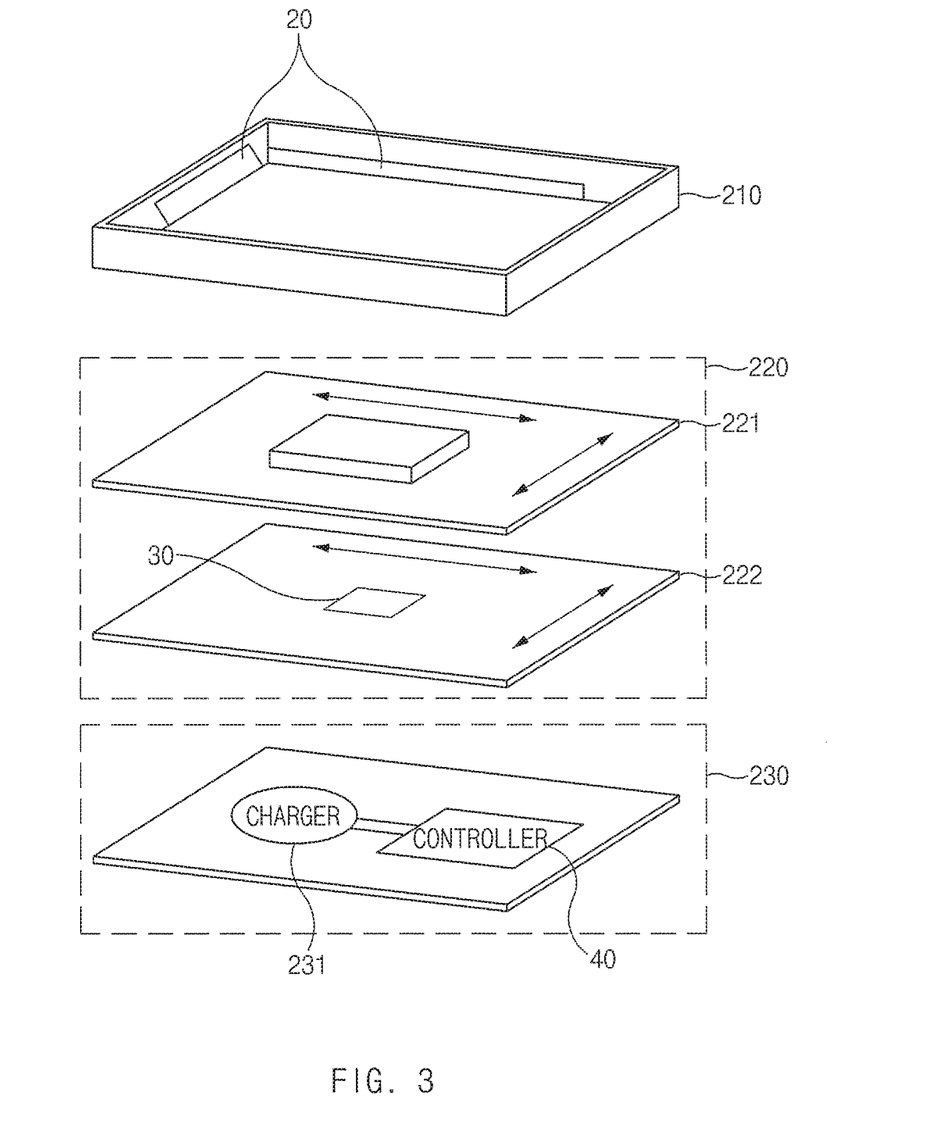
FIG. 3 is a view illustrating details of a structure of a charging pad according to an exemplary embodiment in the present disclosure.

FIG. 3 is a view illustrating details of a structure of a charging pad according to an exemplary embodiment in the present disclosure.

As illustrated in FIG. 3, the position sensor 20 may be disposed on the rectangular partition 210. The position sensor may sense a length and a width of a portable device, contact or non-contact of the portable device with the partition 210, and the like. That is, the position sensor 20 may include a first position sensor disposed on a longer side of the partition 210 and a second position sensor disposed on a shorter side of the partition 210, thereby sensing the length and the width of the portable device, the contact or non-contact of the portable device with the partition 210, and the like. Here, each of the first position sensor and the second position sensor may include a pressure sensor and a photosensor.

In addition, the moving board 220 includes a first moving board 221 for moving the portable device and a second moving board 222 for moving the charge sensor 30.

The first moving board 221, which is disposed on the upper layer of the moving board 220 to directly contact the portable device, may move horizontally by a motor (not shown) or the like, in upward, downward, leftward, and/or rightward directions, and may move the portable device to a designated position under control of the controller 40.

The second moving board 222 may be disposed on the lower layer of the moving board 220 and have the charge sensor attached to a top surface of the second moving board 222. The second moving board 222 may move horizontally by the motor or the like, in the upward, downward, leftward, and/or rightward directions, and may move the charge sensor 30 to a designated position under control of the controller 40.

In addition, the wireless charging board 230 may include a charger 231 for charging the portable device and the controller 40 and may be a fixed board.

Figure 4:
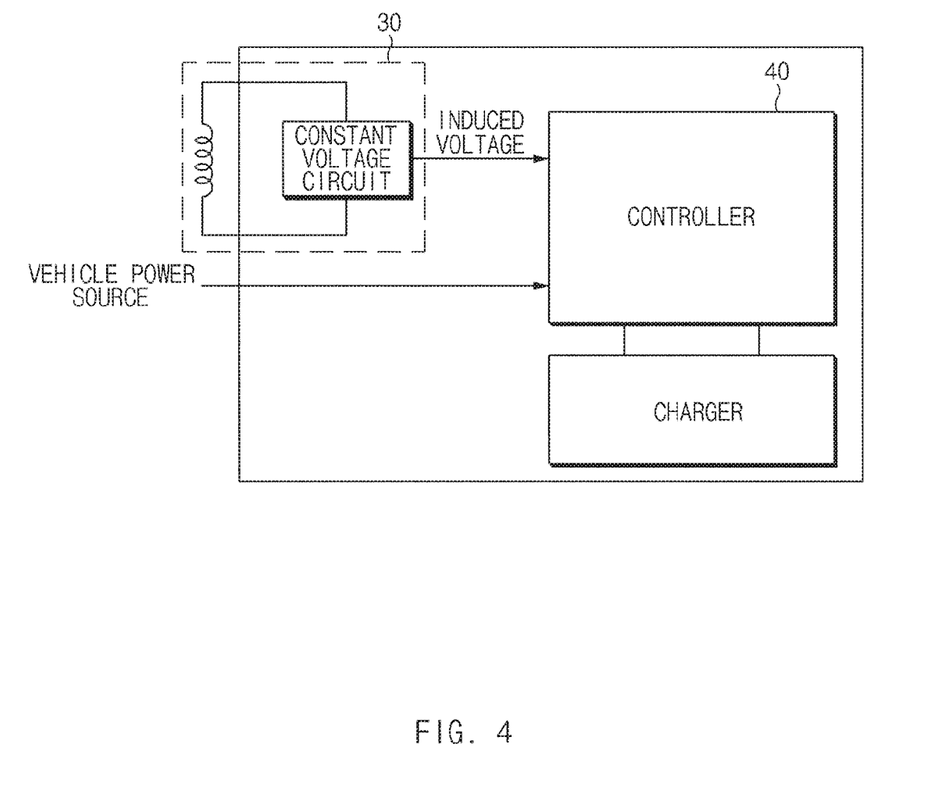
FIG. 4 is a view illustrating a connection relationship between a controller on a wireless charging board and a charge sensor on a second moving board according to an exemplary embodiment in the present disclosure.

As illustrated in FIG. 4, the controller 40 on the wireless charging board 230 may be connected to the charge sensor 30 on the second moving board 222, such that an induced voltage sensed by the charge sensor 30 may be transmitted to the controller 40. In addition, the controller 40 may charge the portable device by using a vehicle power source (a battery).

The position sensor 20 may determine whether the portable device is present on a designated position or not.

The charge sensor 30 may be, for example, a charge sensing coil, and may sense a voltage (induced voltage) induced from a charging coil of the portable device.

The controller 40 generally controls the aforementioned respective elements to perform the functions thereof normally.

In particular, the controller 40 may move the portable device on the wireless charging pad within the vehicle to the plurality of reference positions sequentially, detect an optimal charging position on the wireless charging pad on the basis of induced voltage measured in each of the reference positions, and move the portable device to the optimal charging position.

Hereinafter, functions of the controller 40 will be detailed with reference to FIGS. 5 to 8.

Figure 5:
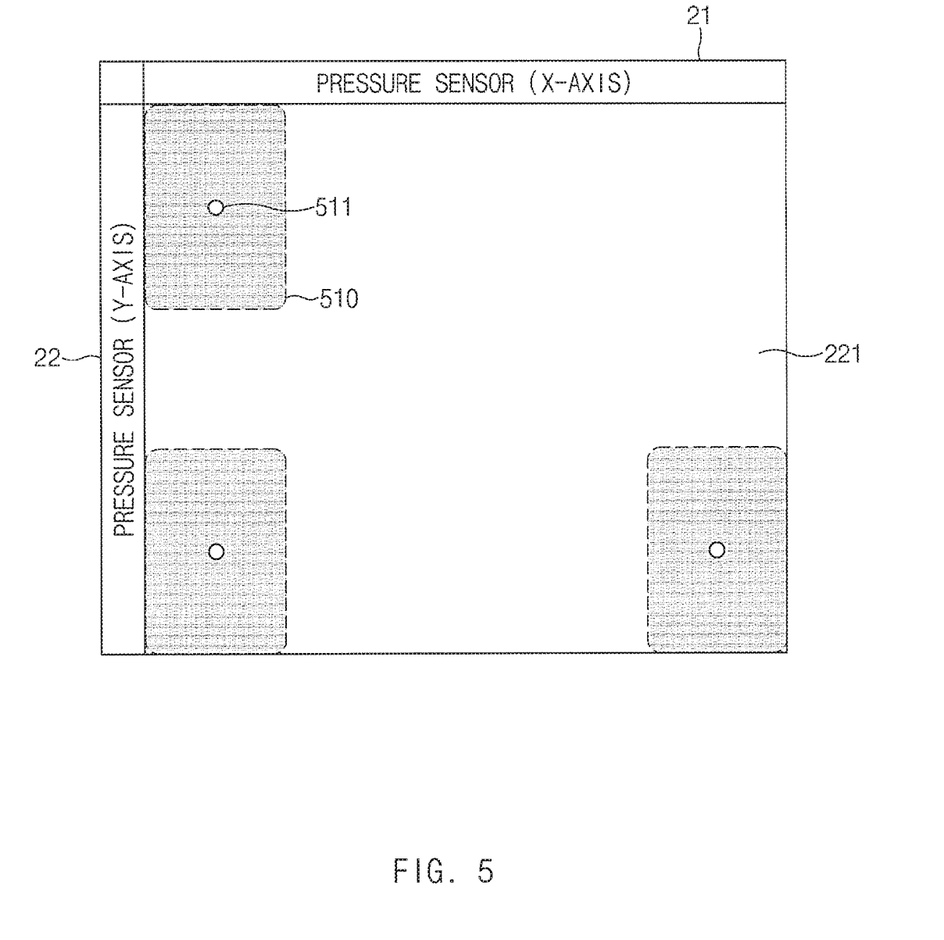
FIG. 5 is a view illustrating reference positions of a portable device on a first moving board according to an exemplary embodiment in the present disclosure.

FIG. 5 is a view illustrating reference positions of a portable device on a first moving board according to an exemplary embodiment in the present disclosure.

In FIG. 5, "510" denotes a portable device, and "511" denotes a central point of the portable device. The portable device 510 is disposed on the first moving board 221, and the partition 210 is disposed at the edges of the first moving board 221. Pressure sensors 21 and 22 are disposed on a longer side and a shorter side of the partition 210, respectively. Here, the pressure sensor 21 disposed on the longer side may be defined by an x-axis and the pressure sensor 22 disposed on the shorter side may be defined by a y-axis. Alternatively, the pressure sensor 21 disposed on the longer side may be defined by a y-axis and the pressure sensor 22 disposed on the shorter side may be defined by an x-axis.

The controller 40 may move the portable device 510 to reference positions, that is, the bottom right-hand corner, the bottom left-hand corner, and the top left-hand corner, in sequential order. Here, the order does not have any effect on the present disclosure.

Thereafter, the controller 40 may control the charge sensor 30 to measure an induced voltage in each of the reference positions.

For example, when the portable device 510 is disposed in a top left-hand corner, the controller 40 may control the second moving board 222 to align the charge sensor 30 with the central point 511 of the portable device 510, and then control the charge sensor 30 to measure the induced voltage. In this manner, the controller 40 measures the induced voltage in each of the reference positions.

Figure 6:
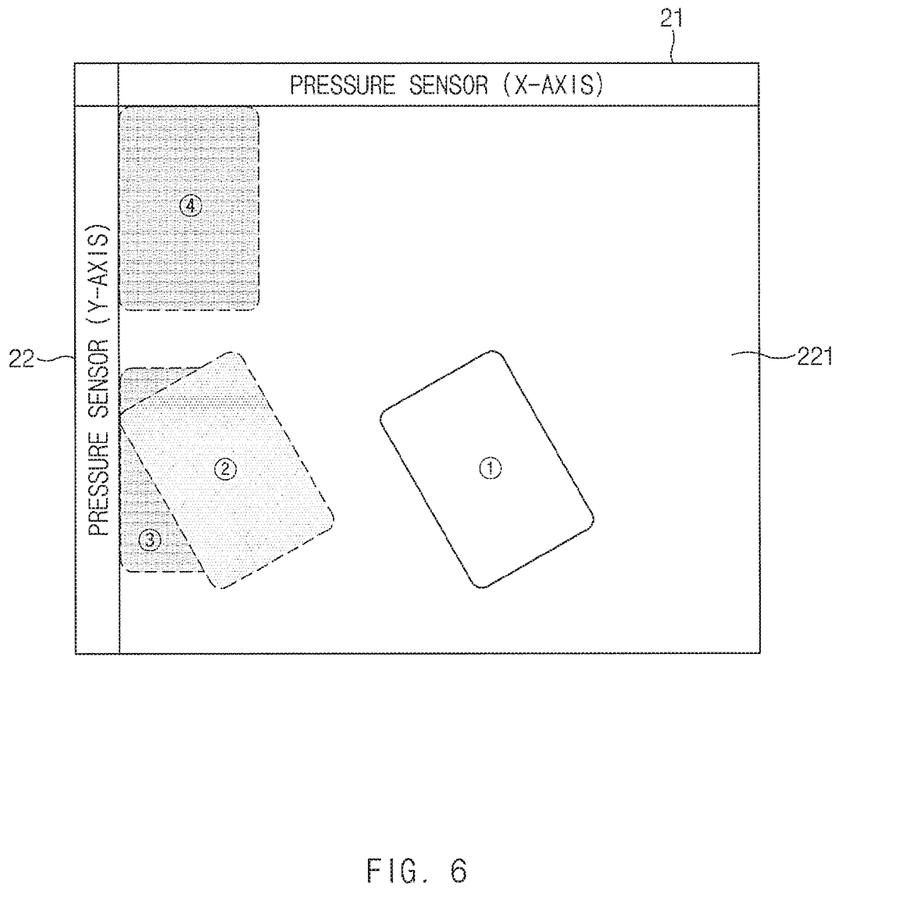
FIG. 6 is a view illustrating a process of aligning a portable device in a vertical direction according to an exemplary embodiment in the present disclosure.

FIG. 6 is a view illustrating a process of aligning a portable device in a vertical direction according to an exemplary embodiment in the present disclosure. FIG. 6 shows a process of moving the portable device to a reference position (④) when the portable device is in an inclined position (①).

First, the controller 40 may move the first moving board 221 to a left-hand side, and when the portable device contacts the shorter side of the partition (②), the controller may further move the first moving board 221 to the left-hand side, thereby aligning the portable device vertically (③). Here, the portable device is illustrated as being aligned in a vertical direction, but a vertical alignment or a horizontal alignment does not matter.

Next, the controller 40 may move the first moving board 221 to the top, thereby placing the portable device in the reference position (④).

Here, the controller 40 may sense the position of the portable device through the x-axis pressure sensor 21 and the y-axis pressure sensor 22.

Figure 7:
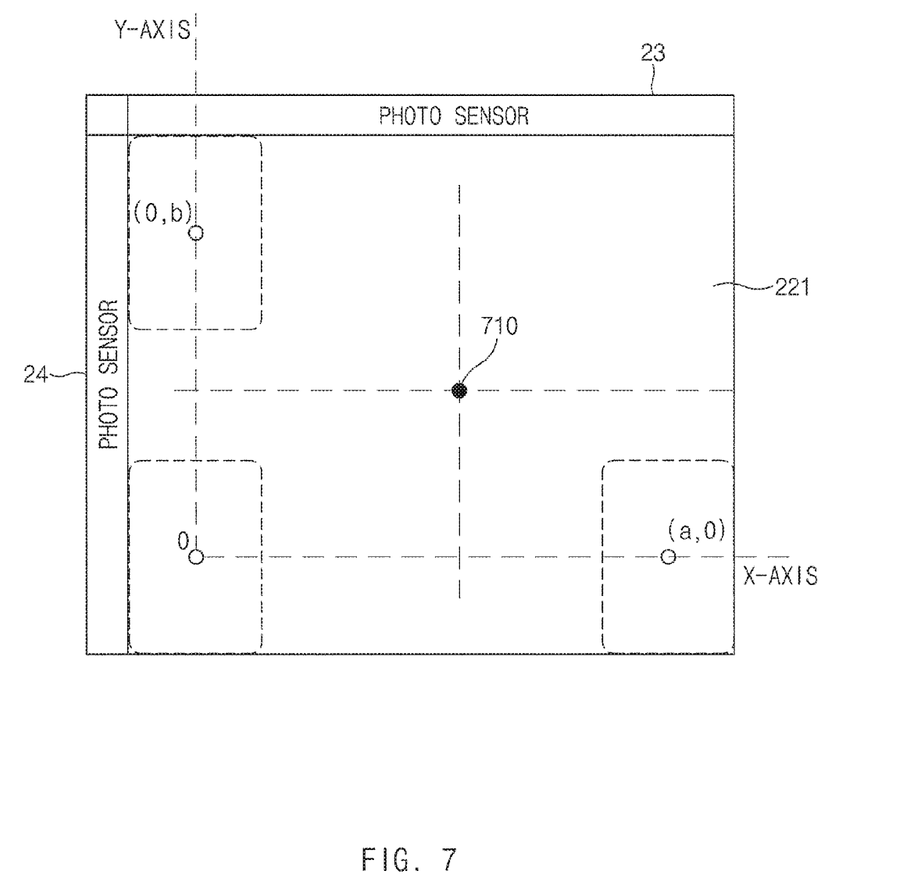
FIG. 7 is a view illustrating a process of calculating a central point and an optimal position of a portable device according to an exemplary embodiment in the present disclosure.

FIG. 7 is a view illustrating a process of calculating a central point and an optimal position of a portable device according to an exemplary embodiment in the present disclosure.

In FIG. 7, a photosensor 23 disposed on a longer side of the partition 210 may be defined by an x-axis, and a photosensor 24 disposed on a shorter side of the partition 210 may be defined by a y-axis.

The controller 40 may detect a central point of the portable device in each of the reference positions through the x-axis photosensor 23 and the y-axis photosensor 24. That is, the controller 40 may measure the length and width of the portable device through the photosensors 23 and 24, thereby detecting the central point of the portable device.

The coordinates of the central point detected in the aforementioned manner are (0,0) in a first reference position (the bottom left-hand corner), (0,b) in a second reference position (the top left-hand corner), and (a,0) in a third reference position (the bottom right-hand corner).

Then, the controller 40 may calculate an optimal charging position (x,y) according to the following [Equation 1]:

$$x = a \times \frac{V1}{V0 + V1}$$
$$y = b \times \frac{V2}{V0 + V2}$$

Equation 1

Here, a indicates an x-coordinate value of the central point of the portable device in the third reference position, and b indicates a y-coordinate value of the central point of the portable device in the second reference position.

In addition, V0 indicates an induced voltage sensed by the charge sensor 30 in the first reference position; V1 indicates an induced voltage sensed by the charge sensor 30 in the third reference position; and V2 indicates an induced voltage sensed by the charge sensor 30 in the second reference position.

Figure 8:
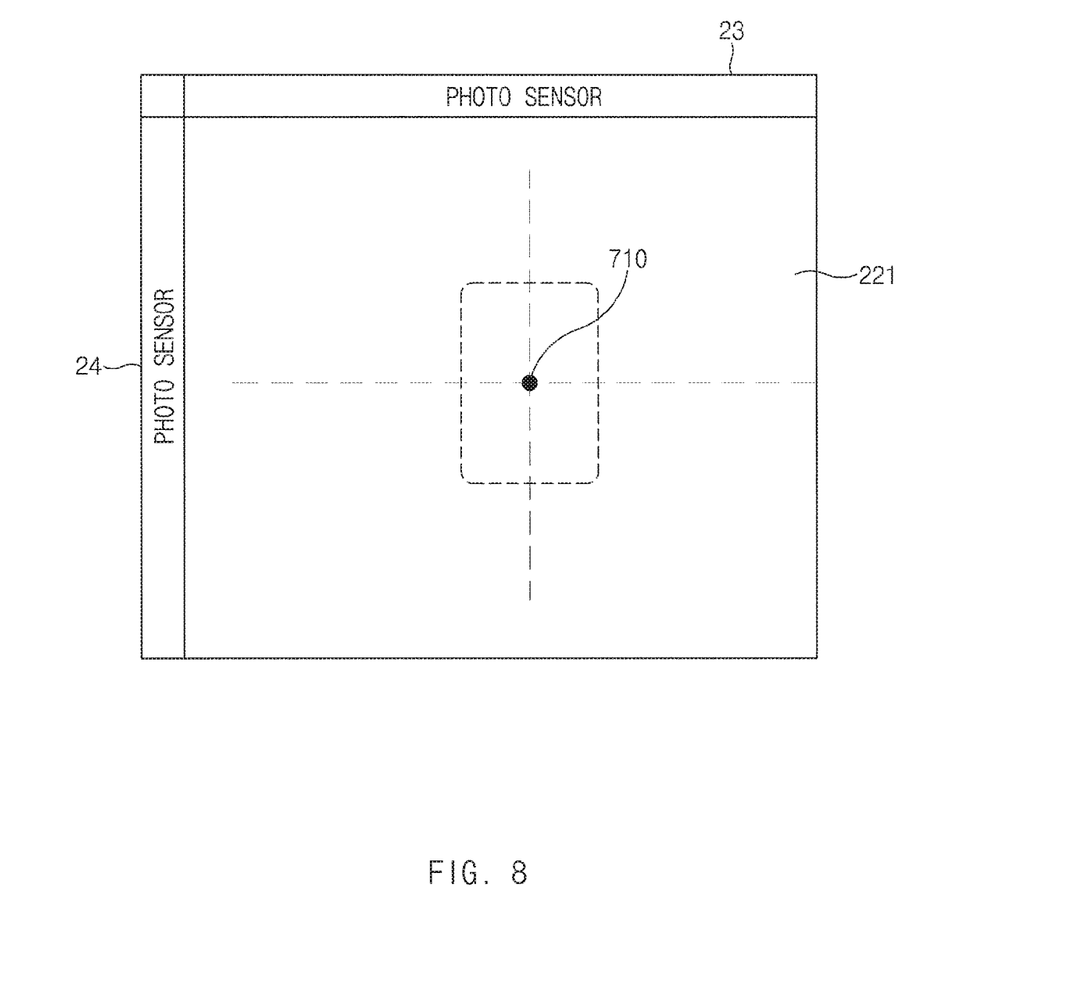
FIG. 8 is a view illustrating an optimal position of a portable device according to an exemplary embodiment in the present disclosure.

Thereafter, the controller 40 may control the first moving board 221 to place the portable device in the optimal charging position (x,y) as illustrated in FIG. 8.

In addition, the controller 40 may monitor the position of the portable device periodically, and may re-perform the aforementioned process when the portable device is out of the optimal charging position 710, thereby placing the portable device in the optimal charging position 710 at all times. Here, the controller 40 may monitor the induced voltage from the charging coil of the portable device in the optimal charging position 710 so as to check whether the portable device is out of the optimal charging position or not.

Figure 9:
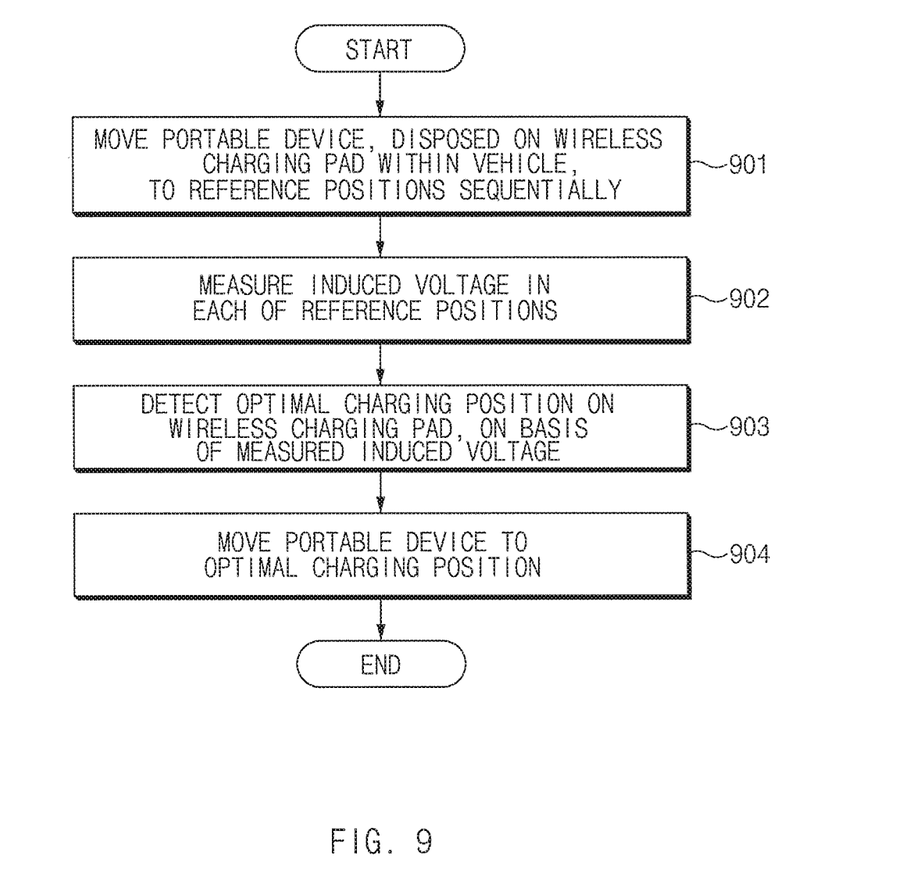
FIG. 9 is a flowchart illustrating a method for aligning a portable device in a wireless charger according to an exemplary embodiment in the present disclosure.

FIG. 9 is a flowchart illustrating a method for aligning a portable device in a wireless charger according to an exemplary embodiment in the present disclosure.

First, the controller 40 may control the position regulator 10 to move a portable device on a wireless charging pad within a vehicle to a plurality of reference positions sequentially (901).

The controller 40 may control the charge sensor 30 to measure an induced voltage in each of the reference positions (902). Here, the controller 40 may further control the position regulator 10 to align the charge sensor 30 with the central point of the portable device in each of the reference positions.

Next, the controller 40 may detect an optimal charging position on the wireless charging pad, on the basis of the induced voltage measured by the charge sensor 30 in each of the reference positions (903).

Thereafter, the controller 40 may control the position regulator 10 to move the portable device to the optimal charging position (904).

Throughout such a process, the method according the present disclosure charges the portable device while maintaining the optimal charging efficiency, regardless of the size of the portable device.

The above-stated method the present disclosure may be written as a computer program. Codes and code segments constituting the program may easily be inferred by a computer programmer skilled in the art. In addition, the written program may be stored in a non-transitory computer-readable recording medium (an information storage medium) and be read and executed by a computer, thereby implementing the method according to the present disclosure. The recording medium includes all types of computer-readable recording media.

As set forth above, according to the exemplary embodiments in the present disclosure, by moving a portable device on a wireless charging pad within a vehicle to a plurality of reference positions sequentially, detecting an optimal charging position on the wireless charging pad on the basis of induced voltage measured in each of the reference positions, and moving the portable device to the optimal charging position, the portable device can be charged while maintaining optimal charging efficiency, regardless of the size of the portable device.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wireless charger having an automatic alignment function, the wireless charger comprising:
   a charge sensor sensing charging of a portable device disposed on a wireless charging pad within a vehicle;
   a position regulator regulating positions of the portable device and the charge sensor;
   a position sensor sensing the position of the portable device; and
   a controller configured to move the portable device to a plurality of reference positions on the wireless charging pad sequentially, to detect a charging position on the wireless charging pad based on an induced voltage that is measured in each of the plurality of reference positions, and to move the portable device to the charging position,
   wherein the plurality of reference positions are used for detecting position information of the charging position, and
   wherein the wireless charging pad comprises:
      a wireless charging board;
      a first moving board on which the portable device is disposed;
      a second moving board on which the charge sensor is mounted; and
      a partition preventing the portable device from being separated.

2. The wireless charger according to claim 1, wherein the controller moves the portable device to each of the reference positions sequentially after vertically aligning the portable device.

3. The wireless charger according to claim 1, wherein the controller controls the position regulator to align the charge sensor with a central point of the portable device when the induced voltage is measured in each of the reference positions.

4. The wireless charger according to claim 1, wherein the reference positions are a bottom right-hand corner, a bottom left-hand corner, and a top left-hand corner of the wireless charging pad.

5. The wireless charger according to claim 4, wherein the controller calculates the charging position (x, y) according to the following equation:

$$x = a \times \frac{V1}{V0 + V1}$$
$$y = b \times \frac{V2}{V0 + V2},$$

wherein a indicates an x-coordinate value of a central point of the portable device in the top left-hand corner, b indicates a y-coordinate value of a central point of the portable device in the bottom right-hand corner, V0 indicates an induced voltage measured in the bottom left-hand corner, V1 indicates an induced voltage measured in the bottom right-hand corner, and V2 indicates induced voltage measured in the top left-hand corner.

6. The wireless charger according to claim 1, wherein the controller monitors the portable device periodically to maintain the charging position of the portable device.

7. The wireless charger according to claim 1, wherein the first moving board is spaced apart from a top surface of the second moving board by a first distance,
wherein the second moving board is spaced apart from a top surface of the wireless charging board by a second distance, and
wherein the partition is disposed at an edge of the first moving board.

8. The wireless charger according to claim 7, wherein the partition has a quadrangular shape and includes a first position sensor on a side of the partition and a second position sensor on another side of the partition.

9. The wireless charger according to claim 8, wherein each of the first position sensor and the second position sensor includes a pressure sensor and a photosensor.

10. A method for aligning a portable device in a wireless charger, the method comprising:
   moving, by a controller, a portable device, which is disposed on a wireless charging pad within a vehicle, to a plurality of reference positions sequentially;
   measuring, by a charge sensor, an induced voltage in each of the plurality of reference positions;
   detecting, by the controller, a charging position on the wireless charging pad based on the measured induced voltage; and
   moving, by the controller, the portable device to the charging position,
   wherein the plurality of reference positions are used for detecting position information of the charging position, and
   wherein the wireless charging pad comprises:
      a wireless charging board;
      a first moving board on which the portable device is disposed;
      a second moving board on which the charge sensor is mounted; and
      a partition preventing the portable device from being separated.

11. The method according to claim 10, wherein the step of moving the portable device to the plurality of reference positions comprises moving the portable device to each of the reference positions after vertically aligning the portable device.

12. The method according to claim 10, wherein the step of measuring the induced voltage comprises controlling a position regulator to align the charge sensor with a central point of the portable device when the induced voltage is measured in each of the reference positions.

13. The method according to claim 10, wherein the reference positions are a bottom right-hand corner, a bottom left-hand corner, and a top left-hand corner of the wireless charging pad.

14. The method according to claim 13, wherein the step of detecting the charging position comprises calculating the charging position (x, y) according to the following equation:

$$x = a \times \frac{V1}{V0 + V1}$$
$$y = b \times \frac{V2}{V0 + V2},$$

wherein a indicates an x-coordinate value of a central point of the portable device in the top left-hand corner, b indicates a y-coordinate value of a central point of the portable device in the bottom right-hand corner, V0 indicates an induced voltage measured in the bottom left-hand corner, V1 indicates an induced voltage measured in the bottom right-hand corner, and V2 indicates an induced voltage measured in the top left-hand corner.

15. The method according to claim 10, further comprising: monitoring the portable device periodically to maintain the charging position of the portable device.

* * * * *